United States Patent [19]

Bhandarkar et al.

[11] Patent Number: 5,613,995
[45] Date of Patent: Mar. 25, 1997

[54] METHOD FOR MAKING PLANAR OPTICAL WAVEGUIDES

[75] Inventors: Suhas D. Bhandarkar, Murray Hill; John B. MacChesney, Lebanon, both of N.J.

[73] Assignee: Lucent Technologies Inc., Murray Hill, N.J.

[21] Appl. No.: 329,034

[22] Filed: Oct. 25, 1994

Related U.S. Application Data

[63] Continuation of Ser. No. 52,357, Apr. 23, 1993, abandoned.

[51] Int. Cl.$^6$ .................................................. C03B 19/06
[52] U.S. Cl. ................................. 65/384; 65/386; 65/427; 385/132
[58] Field of Search ................................ 65/386, 430, 416, 65/427, 384; 385/129, 130, 132

[56] References Cited

U.S. PATENT DOCUMENTS

| | | | |
|---|---|---|---|
| 3,212,921 | 10/1965 | Pliskin . | |
| 3,667,925 | 6/1972 | Sheppard | 65/43 |
| 3,923,484 | 12/1975 | Randall | 65/18 |
| 4,443,239 | 4/1984 | Biswas | 65/3.11 |
| 4,474,425 | 10/1984 | Kaede | 350/96 |
| 4,561,718 | 12/1985 | Nelson | 350/96.14 |
| 4,588,540 | 5/1986 | Kiefer | 264/43 |
| 4,619,680 | 10/1986 | Nourshargh | 65/3.12 |
| 4,642,129 | 2/1987 | Douklias | 65/3.12 |
| 4,645,524 | 2/1987 | Bocko et al. | 65/18.2 |
| 4,765,818 | 8/1988 | Che | 65/18.1 |
| 4,781,424 | 11/1988 | Kawachi | 350/96.3 |
| 4,851,023 | 7/1989 | Gonzales-Oliver | 65/18.1 |
| 4,856,859 | 8/1989 | Imoto | 350/96.12 |
| 4,888,036 | 12/1987 | Clasen | 65/18.1 |
| 4,906,311 | 3/1990 | Gurol | 156/89 |
| 4,936,645 | 1/1990 | Yoon | 350/96.14 |
| 4,979,973 | 12/1990 | Takita | 65/900 |
| 5,013,347 | 5/1991 | Seng | 65/43 |
| 5,068,071 | 11/1991 | O'Holleran | 65/18.1 |
| 5,143,533 | 9/1992 | Brusasco | 65/18.3 |
| 5,179,614 | 1/1993 | Kanamori et al. | 65/3.11 |

FOREIGN PATENT DOCUMENTS

| | | | |
|---|---|---|---|
| 57-170841 | 10/1982 | Japan . | |
| 0173804 | 10/1982 | Japan | 65/3.11 |
| 0037604 | 3/1983 | Japan | 65/3.11 |
| 0198407 | 11/1984 | Japan | 65/3.11 |
| 1435523 | 5/1976 | United Kingdom | 65/3.11 |

OTHER PUBLICATIONS

Foster, et al. IBM Technical Disclosure, vol. 16, No. 4, (1973).
Kingery et al., Introduction to Ceramics, 1976, pp. 92–93.

*Primary Examiner*—David A. Simmons
*Assistant Examiner*—John Hoffmann
*Attorney, Agent, or Firm*—Glen E. Books; Eugen E. Pacher

[57] ABSTRACT

In accordance with the invention a planar waveguide device is fabricated by providing a substrate with an undercladding, depositing a particulate layer of core glass on the undercladding, consolidating the particulate layer by low temperature viscous sintering, patterning the consolidated layer to form an optical waveguide and applying an overcladding. The glass layers can be deposited quickly and economically by slurry dipping, centrifuging or electrophoresis. In a preferred embodiment the substrate is silicon, and the core glass is sodium-boro-silicate.

9 Claims, 3 Drawing Sheets

5,613,995

METHOD FOR MAKING PLANAR OPTICAL WAVEGUIDES

This application is a continuation of application Ser. No. 08/052357, filed on Apr. 23, 1993 now abandoned.

FIELD OF THE INVENTION

This invention relates to methods for making planar optical devices, such as waveguides, and to the resulting devices.

BACKGROUND OF THE INVENTION

With the rapid proliferation of fiber optic communications systems, devices for processing optical signals have become increasingly important. Planar devices comprising optical waveguides fabricated on planar substrates offer a promising environment for receiving and processing signals from optical fibers. Such devices ultimately offer the potential of integrated optical and electronic signal processing on a single semiconductor substrate.

A typical proposal for planar optical devices involves disposing high silica optical wave guiding structures on Silicon substrates. But while high silica glass is suitable for use in optical fiber, it is not optimal for use on silicon. High silica glass is refractory, has a poor thermal expansion match with silicon, requires a long deposition time, and is a poor host for the rare earth dopants contemplated for a number of device applications.

The refractory nature of high silica glass means that high temperatures are generally required to produce an optical waveguide. For example, in the flame hydrolysis method for depositing a high silica core, the deposited particulates are typically sintered at 1200° C. or more. Such temperatures would deteriorate electronic devices formed in the underlying silicon.

Other techniques for depositing high silica glass layers tend to be unduly time consuming. For example, chemical vapor deposition grows only fractions of a micrometer of high silica glass per hour, and high pressure oxidation of silica on silicon typically requires up to 30 hours to generate 15 micrometers.

Other glasses, such as sodium-boro-silicate glass, can be formed in thin films, but it is difficult to make such films that are suitable for optical waveguide applications. Waveguides typically require a smooth outer surface, an essentially bubble free layer having a low density of bubbles (typically less than 10 bubbles/mm$^2$), and—if bubbles cannot be entirely eliminated—bubbles as small as possible. The applicants have observed that prior processes for rapidly making thin, smooth films of glass, such as those disclosed in U.S. Pat. No. 3,212,921 to W. A. Pliskin, produce smooth surfaces at the expense of a high bubble density. Pliskin et al. heat glass powders for a short time (less than one hour), to produce a smooth surface. This is because at the low temperatures and short times used in Pliskin, bubbles rise near the surface but do not penetrate the surface. Thus the Pliskin films exhibit unacceptably high densities of entrapped bubbles (typically on the order of 200 bubbles/mm$^2$). In addition, bubbles as large as 10 microns in diameter are observed. Applicants have further discovered that longer heating times on the order of two to eight hours do not Solve the problem. While longer times reduce the concentration of bubbles, they produce a rugose outer surface unsuitable for waveguides. Accordingly, there is a need for an improved method for making planar waveguide devices.

SUMMARY OF THE INVENTION

Applicants have discovered that using viscous sintering with heating times in excess of eight hours one can obtain smooth surfaced, low bubble density films of glass suitable for use as optical Waveguides. Specifically, planar waveguide device can be fabricated by providing a substrate with an undercladding, depositing a particulate layer of core glass on the undercladding, consolidating the particulate layer by viscous sintering at low temperatures for more than eight hours, patterning the consolidated layer to form an optical Waveguide and applying an overcladding. The glass particulate layer can be deposited quickly and economically by slurry dipping, centrifuging or electrophoresis. In a preferred embodiment the substrate is silicon, and the core glass is sodium-boro-silicate.

BRIEF DESCRIPTION OF THE DRAWING

The advantages, nature and various additional features of the invention will appear more fully upon consideration nl of the illustrative embodiments now to be described in detail in connection with the accompanying drawings. In the drawings.

It is to be understood that these drawings are for purposes of illustrating the concepts of the invention and, except for graphical illustrations, are not to scale.

DETAILED DESCRIPTION

Figure 1:
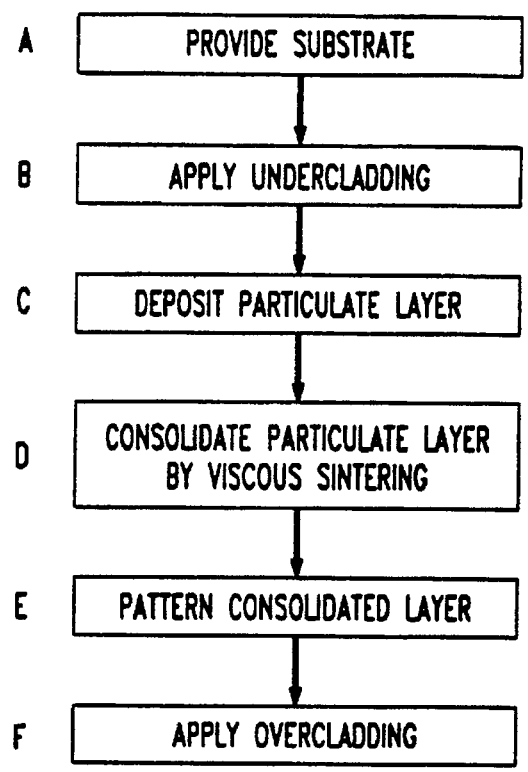
FIG. 1 is a flow diagram showing the preferred process steps used to make a planar optical device in accordance with the invention.
Figure 2:
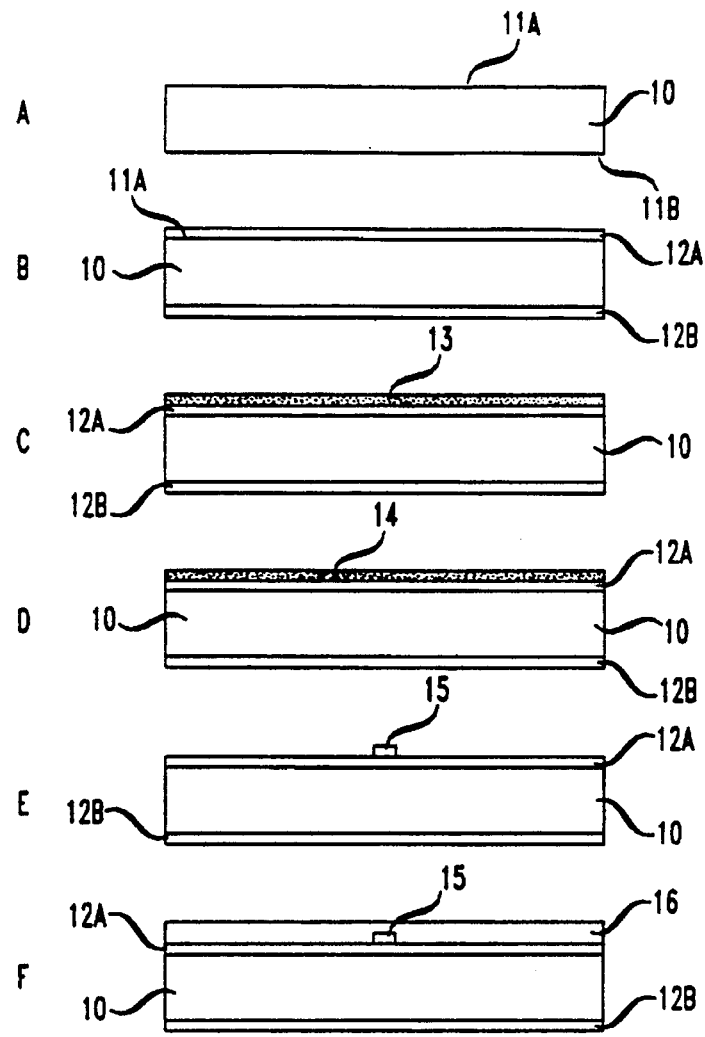
FIG. 2 shows schematic cross sections of a planar optical device at various steps in the process of FIG. 1.

Referring to the drawings, FIG. 1 illustrates the steps in making a planar optical device, and FIG. 2 shows schematic cross sections of a preferred device at various steps in the process of FIG. 1.

As shown in FIG. 1A, the first step is to provide a substrate (10 of FIG. 2). The substrate 10 is preferably a semiconductor, such as monocrystalline silicon, and it preferably has a pair of substantially planar major surfaces 11A and 11B. Alternatively the substrate can be ceramic or glass.

The second step, shown in FIG. 1B is to apply to the major surface 11A a layer of undercladding glass 12A. Preferably for a silicon substrate, the undercladding 12A is high silica glass applied by subjecting the substrate to oxygen at elevated pressure and temperature. Preferably layer 12A is grown by high pressure steam oxidation at a steam pressure of 25 p.s.i. and a temperature of 1050° C. Advantageously layer 12A can be 10–20 micrometers in thickness, and preferably a layer 12B of the same glass at equal thickness is applied to surface 11B in order to prevent warping from thermal mismatch. Advantageously the undercladding layer has a coefficient of thermal expansion approximately equal to or lower than that of the substrate. If the substrate is comprised of undercladding glass, the second step is, of course, not required.

As shown in FIG. 1C, the next step is to deposit over layer 12A a layer 13 of core glass particulates. Preferably the core glass particulates predominantly comprise small particles having diameters less than about a micron. Advantageously the particles have a log normal size vs. weight distribution curve with a mean at about 0.2 micrometers. As a preliminary step, a supply of such particles can be obtained by finely grinding the glass, dispersing the ground particles in liquid, and fractionating the particles by size using a centrifuge.

Useful core glass compositions for single mode waveguides have an index of refraction approximately 0.5% to 0.7% higher than that of the cladding layer 12A and a coefficient of thermal expansion approximately the same as that of the substrate 10. For multimode cores the index of refraction is 1 to 3% higher than the cladding. Preferred core compositions for silicon substrates are sodium boro-silicates such as 7070. Corning 7070 comprises of 71% $SiO_2$, 26% $B_2O_3$, 2% $Na_2O$ and 1% $Al_2O_3$. It has an index of 1.475 and a coefficient of thermal expansion of $32 \times 10^{-7}/°$ C.

Figure 3:
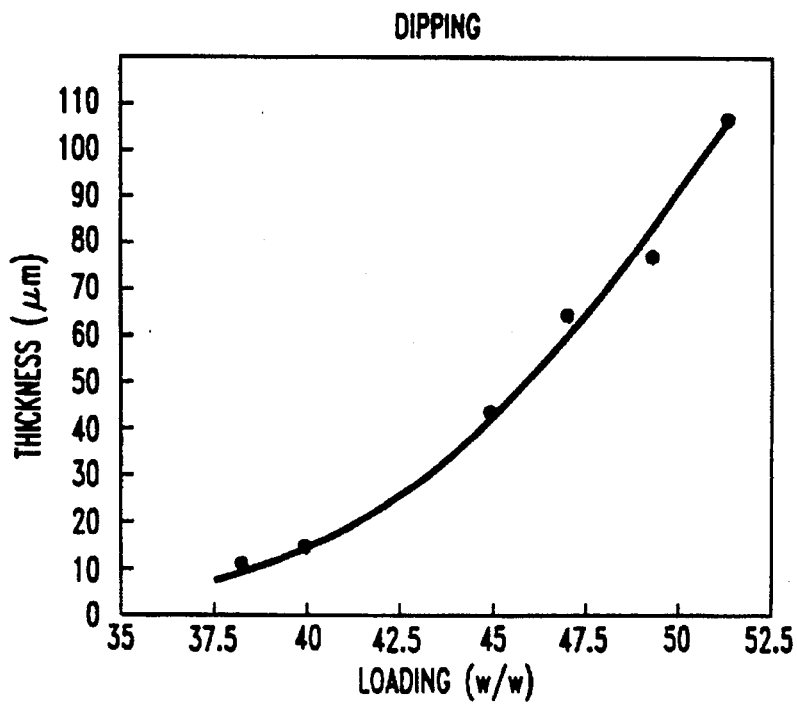
FIG. 3 is a graphical illustration showing the thickness of an unconsolidated, slurry-dipped layer as a function of the loading of particulates in the slurry.

The layer of particulate core glass can be deposited in any of several ways including slurry dipping, centrifuging or electrophoresis. Slurry dipping involves forming a homogeneous slurry of particulates in a liquid such as butyl alcohol, dipping the workpiece in the liquid, and allowing the deposited layer to dry. As graphically illustrated in FIG. 3, the thickness of the resulting particulate layer is a function of the loading, i.e. the ratio of the weight of the suspended particulates to the weight of the slurry. The resulting particulate layer is about 40% of the theoretical density.

Centrifuging, which involves disposing the substrate within a liquid suspension of particles and driving the particles against the substrate by centrifugal motion, produces a higher density particulate layer approaching 60% of the theoretical density. Preferably centrifuging is effected at about 4000 r.p.m. to effect acceleration of 3200 g for a time of 5–10 minutes.

Figure 4:
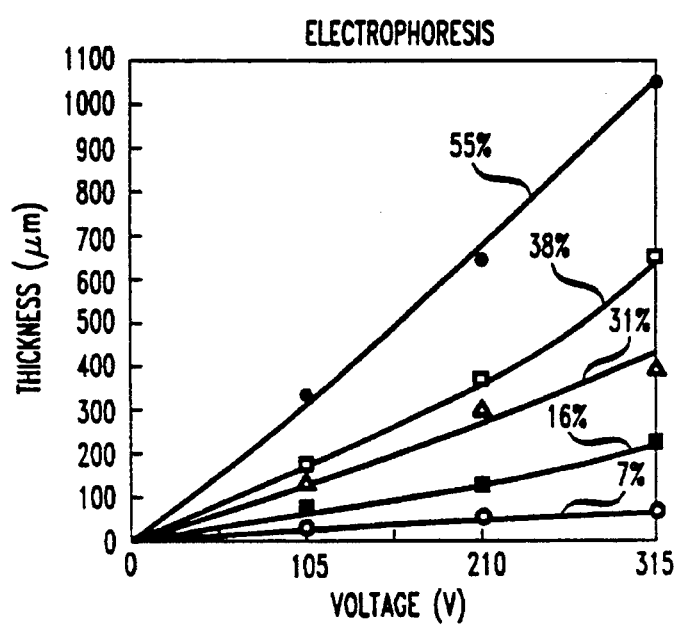
FIG. 4 is a graphical illustration showing, for several values of sol loading, the thickness of a consolidated electrophoresis deposited layer as a function of applied voltage.

Electrophoresis involves a preliminary step applying a sacrificial conductive layer, such as 1000 angstroms of aluminum, on layer 12A, disposing the workpiece in a polar liquid containing the particulate, and applying a positive voltage to the aluminum layer vis a vis a cathode in the liquid. Particles migrate to the substrate. As shown in FIG. 4, for times in excess of about 30 seconds the deposited thickness is a function of sol loading and applied voltage, V. Preferred conditions are V=300 volts, current I=100 mA and interelectrode distance D=2 cm. The resulting particulate layer achieves about 70% of the theoretical density, and with subsequent thermal processing the aluminum is diffused into the adjacent glass layers.

FIG. 1D shows the fourth step is consolidation of the particulate layer 13 (FIG. 2C) by low temperature viscous sintering to form consolidated layer 13 (FIG. 2D). Viscous sintering involves heating the workpiece to a temperature under the softening point for a time sufficient to achieve a surface-driven consolidation of the particulate material and removal of bubbles.

Viscous sintering is a process by which material moves by viscous flow to eliminate porosity. The energy for this process is derived from the reduction of that associated with the solid-vapor surface of microporous solids. This energy is small in the case of most ceramic or glass frits whose particle size is typically 30–50 µm. We ball mill such powder then classify such dispersions by settling to yield particles approximately 0.05–0.5 µm. The driving force for consolidation by viscous sintering is dramatically increased.

Viscous sintering operates to eliminate bubbles and pores in glass bodies, films and coating. This operates because the pores of such material have sizes of a few to a few 10's of nanometers. With larger particle sizes the elimination of pores occur by buoyancy forces which operate when the viscosity of the glass is reduced to sufficiently low levels. The temperature required to reduce to viscosity to the requisite levels is approximately 3/2 that is needed to make viscous sintering operate.

It will be appreciated that sintering at temperatures where the viscosity remains high is essential for waveguide structures composed of a sandwich of glass layers. At viscosities low enough to remove entrapped bubbles by buoyancy forces diffusion and convection caused by the bubbles drifting up, would destroy the definition of the core-guides. In contrast with conventional techniques which typically require high temperatures of 1200° C. or more to eliminate the bubbles from the core glass, viscous sintering can achieve consolidation of a particulate layer at temperatures below the softening point as low as 850° C.–950° C. Preferably this consolidation is effected at a temperature in the range $T_G$ to $T_G+100°$ C. and a time in excess of eight hours in a furnace within the ambience of an inert gas, such as helium. Preferably, the heating time is in excess of 18 hours. For sodium-borosilicate glass the preferred firing schedule is (1) 550° C. in $O_2$ for one hour to burn out any organic materials, (2) cool to room temperature, (3) from room temperature in He to 600° C. in two hours, and (4) from 600° C. in He with 2% $O_2$ to 950° C. in twenty-four hours to effect viscous sintering, and (5) furnace cooling to room temperature. Glass films thus produced exhibit a low bubble density on the order of 1 bubble/mm$^2$. In addition, the bubbles observed are typically less than 3 micrometers in diameter.

The desired thickness for consolidated layer 14 depends on the intended use of the device. For multimode optical waveguides the thickness is typically in the range 15–50 micrometers. For single mode waveguides, typically 3–8 microns.

The next step, shown in FIG 1E, is patterning the consolidated layer into a waveguiding structure (15 of FIG. 2E). This can be accomplished by conventional photolithographic processes using 50% HF diluted 10:1 as the etchant. The shape of the pattern depends on the intended use of the device. Typically optical waveguide cores are substantially square in transverse cross section, but diffusion at high temperature will produce desired rounding. Exemplary longitudinal configurations of waveguide structures for use as couplers and beam splitters are shown in FIGS. 5A and 5B, respectively.

As an alternative to patterning by etching the core glass, if the core is deposited by electrophoresis, the sacrificial aluminum layer can be patterned prior to the electrophoresis deposition step. The core glass particulates will deposit only on the patterned aluminum.

FIG. 1F shows the final step Which is application over the structure 15 of overcladding glass layer 16. Layer 16 has an index of refraction lower than waveguide 15 and a thickness of 10–15 micrometers. Preferably layer 16 is of the same high silica glass of which layer 12 is composed. Advantageously layer 16 is applied by slurry dipping followed by consolidation as described above. The resulting structure acts as an optical waveguide.

It is contemplated that even greater advantages in fabrication can be achieved by using for the cladding layers 12A and 16 a sodium borosilicate glass having an index of refraction lower than the core. In this instance both the undercladding layer and the overcladding can be deposited as particulates and consolidated by viscous sintering as described for the core.

The described method and resulting device have several significant advantages over conventional methods and devices. Foremost, the waveguide structure 15 as well as the cladding are deposited and consolidated rapidly and at a relatively low temperature. Moreover, the preferred waveguide structure of sodium borosilicate is thermally compatible with silicon and serves as an excellent host to rare earth dopants.

Figure 5:
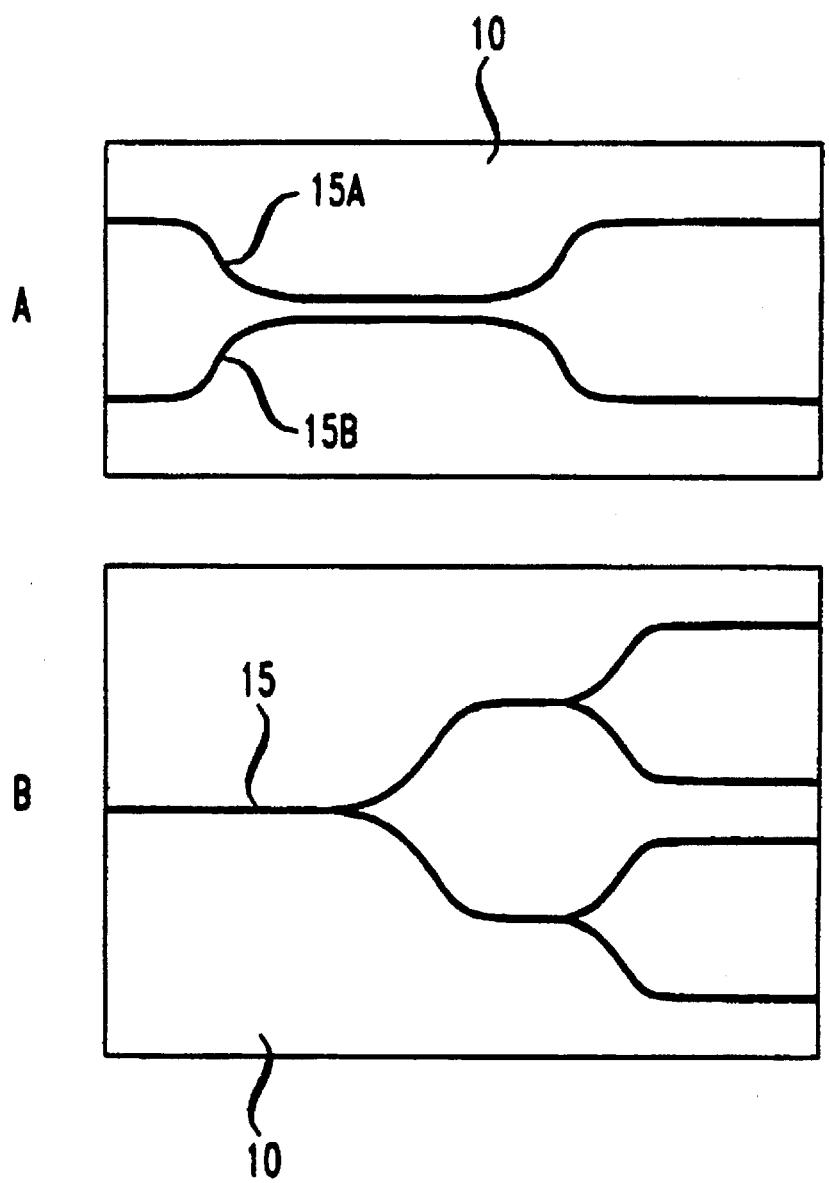
FIG. 5 shows schematic plan views in elevation of various exemplary configurations in which the device of FIG. 2 can be employed.

FIG. 5 shows schematic top views of two optical circuit elements using the planar waveguide structure of FIG. 2. For example, FIG. 5A illustrates a simple optical directional coupler comprising a waveguide structure comprising two cores 15A and 15B formed and disposed as described within cladding (not shown) on a substrate 10. The cores are patterned to approach within a few microns of each other to define an interaction region wherein light from one core is coupled onto the other. For 2–3 micrometer spacing, typical interaction lengths for 100% coupling are 2–4 micrometers for wavelengths in the range 1.29 to 1.55 micrometers.

FIG. 5B illustrates a simple optical beam splitter useful for branching and combining optical signals. Here, what is initially a single waveguide is patterned to repeatedly branch into a plurality of guides. In one direction the device operates as a beam splitter. In the reverse direction it can combine several beams. Conveniently, the structures of FIGS. 5A and 5B can be provided with optical fiber guiding grooves (not shown) in accordance with techniques well known in the art, for aligning optical fibers with the cores 15.

It is to be understood that the above-described embodiments are illustrative of only a few of the many possible specific embodiments which can represent applications of the principles of the invention. For example, FIG. 5 illustrates only two of many possible optical circuit elements which can be made using the guiding structure disclosed in FIG. 2. Other optical circuit elements into which the guiding structure can be patterned include straight waveguides, curvatures X-crosses, optical switches and Y-branches. Moreover, while the method has been described in connection with an exemplary silicon substrate, and sodium borosilicate core, the method can be used with other types of substrates and glasses, such as stainless steel in conjunction with fluoride, phosphate or flint glasses. Numerous and varied other arrangements can be readily devised in accordance with these principles by those skilled in the art without departing from the spirit and scope of the invention.

We claim:

1. A method of making a planar optical waveguide device comprising the steps of
   a) providing a silicon substrate having a coefficient of thermal expansion and a major surface;
   b) forming on the major surface a layer of glass to act as an undercladding;
   c) forming on said layer of glass a particulate layer of a glass comprising $SiO_2$ and boron, said particulate layer predominantly comprising glass particles having diameters less than about a micron;
   d) consolidating the particulate layer by a heat treatment comprising low temperature viscous sintering at 950° C. or less for a period in excess of eight hours and sufficient to produce an essentially bubble free consolidated particulate layer;
   e) making an optical waveguide core from the consolidated particulate layer; and
   f) forming on said optical waveguide core a layer of glass to act as an overcladding.

2. The method of claim 1 wherein said undercladding is formed on said major surface by a process that comprises forming a layer of glass particles on the major surface, and consolidating the layer of glass particles by viscous sintering.

3. The method of claim 1 wherein said particulate layer is formed on said undercladding by a process that comprises contacting the undercladding with a slurry containing said glass particles.

4. The method of claim 1 wherein said particulate layer is disposed over said undercladding by centrifuging.

5. The method of claim 1 wherein said particulate layer is disposed over said undercladding by electrophoresis.

6. The method of claim 1 wherein said overcladding is formed on said optical waveguide core by a process that comprises contacting the optical waveguide core with a slurry containing glass particulates.

7. Method of claim 1, wherein the substrate is single crystal silicon, the undercladding is high silica glass, the particulate layer consists of a sodium borosilicate glass, the overcladding comprises high silica glass, and the borosilicate glass has a coefficient of thermal expansion approximately the same as that of the single crystal silicon substrate.

8. Method according to claim 7, wherein the undercladding is selected to have a coefficient of thermal expansion approximately equal to or lower than that of the single crystal Si substrate.

9. Method according to claim 1, wherein each of the undercladding and overcladding comprises sodium borosilicate glass.

\* \* \* \* \*